US012721357B1

(12) United States Patent
Deng

(10) Patent No.: US 12,721,357 B1
(45) Date of Patent: Sep. 1, 2026

(54) ELECTRONIC SMOKER

(71) Applicant: Youqiong Deng, Chenzhou (CN)

(72) Inventor: Youqiong Deng, Chenzhou (CN)

( * ) Notice: Subject to any disclaimer, the term of this patent is extended or adjusted under 35 U.S.C. 154(b) by 0 days.

(21) Appl. No.: 19/328,026

(22) Filed: Sep. 12, 2025

(51) Int. Cl.
*A23B 4/052* (2006.01)
*F21V 3/00* (2015.01)
*F21V 23/04* (2006.01)
*F23Q 3/00* (2006.01)

(52) U.S. Cl.
CPC ................ *A23B 4/052* (2013.01); *F21V 3/00* (2013.01); *F21V 23/04* (2013.01); *F23Q 3/00* (2013.01)

(58) Field of Classification Search
CPC ........ A23B 4/044; A23B 4/052; A23B 4/0523
USPC ............................................................ 99/482
See application file for complete search history.

(56) References Cited

U.S. PATENT DOCUMENTS 10,638,768 B2 * 5/2020 Flood ..................... B01D 46/10
11,744,256 B2 * 9/2023 Sumner .................. A23B 4/052 426/314
11,759,033 B1 * 9/2023 Lv ....................... F21V 23/0428 362/101
12,324,440 B1 * 6/2025 Zheng .................... A23B 4/052
12,357,120 B2 * 7/2025 Kiriseko ................ B05B 1/002
12,402,641 B2 * 9/2025 Wang ..................... A23B 4/052
12,604,913 B1 * 4/2026 Tang .................... A23B 4/0523
2013/0008319 A1 * 1/2013 Kokenis ............. A47J 37/0629 99/344
2022/0361543 A1 * 11/2022 Middleton ............. A23L 27/27
2023/0301315 A1 * 9/2023 Guan ..................... A23B 4/052

FOREIGN PATENT DOCUMENTS

CN 114173566 A 3/2022
CN 216688065 U 6/2022
CN 220343547 U 1/2024

* cited by examiner

*Primary Examiner* — Craig M Schneider
(74) *Attorney, Agent, or Firm* — Nitin Kaushik

(57) ABSTRACT

Disclosed is an electronic smoker, relating to the technical field of electronic cigarettes and including a housing and a cover that are detachably connected. A control board, a battery, a compressor, and a motor are disposed in the housing; and the cover is provided with a combustion pot used for storing solid fuel. A housing cover is provided with an electronic arc generator through a ceramic thermal insulation sheet, and a thermal insulation plate is disposed on a periphery of the electronic arc generator, to form a combustion chamber with the combustion pot. The compressor blows air into the combustion chamber through an air guide pipe, to promote complete combustion of the fuel. The cover is connected to the housing through a snap and a snap groove, and a sensor is provided, to ensure that the cover is closed in place before starting, thereby improving safety.

7 Claims, 8 Drawing Sheets

ELECTRONIC SMOKER

TECHNICAL FIELD

This disclosure relates to the technical field of electronic cigarettes, and specifically, to an electronic smoker that is used for heating solid fuel such as wood chips to generate smoke and has safety protection and atmosphere creation functions.

BACKGROUND

With the increasing popularity of smoker products, those that use solid fuel (such as wood chips and herbs) as consumables are gaining popularity. These smokers heat these kinds of materials to produce aromatic smoke, which can be used for atmosphere creation or for leisure scenarios. However, existing electronic smokers still suffer from the following common problems:

First, combustion is incomplete. Most products adopt simple air supply methods, making it difficult for airflow to act evenly on the fuel, which results in unstable smoke generation, a tendency for burnt smells, and low fuel utilization.

Second, thermal insulation and safety design are insufficient. Heat transfer from the combustion area to the housing is obvious, posing a risk of burns. There is also a lack of effective accidental start prevention mechanisms.

Third, disassembly and cleaning are cumbersome. Most combustion pots are fixedly or threadedly mounted, making fuel replacement and cleaning steps tedious.

Fourth, functionality is relatively single, lacking modern user experience designs such as battery power indication, Type-C charging, and light atmospheres. Battery life management is also inadequate.

Therefore, it is necessary to provide a solution of an electronic smoker that offers more complete combustion, enhanced safety, ease of use and maintenance, and better user experience.

SUMMARY

This disclosure provides an electronic smoker, aiming to solve problems in the prior art such as incomplete combustion, poor thermal insulation performance, low safety, inconvenient disassembly and assembly, and a single function. To achieve the above purpose, this disclosure adopts the following technical solution:

The electronic smoker includes a housing and a cover that are detachably connected, where a housing cover is disposed at the bottom of the housing, and a control board, a battery, a compressor, and a motor driving the compressor are disposed in the housing. A combustion pot is disposed in the middle of the cover and is used for placing solid fuel such as wood chips. The housing cover is provided with an electronic arc generator through a ceramic thermal insulation sheet. The thermal insulation sheet abuts against the bottom of the combustion pot, thereby ensuring that heat is concentrated to ignite the fuel while implementing thermal insulation. A thermal insulation plate is disposed on a periphery of the electronic arc generator, to jointly form a sealed combustion chamber with the combustion pot, thereby ensuring that a combustion process is safe and efficient. An air outlet of the compressor extends into the combustion chamber through an air guide pipe and can accurately deliver air to a fuel combustion area, thereby promoting complete combustion and avoiding local carbonization or unstable smoke.

Further, the cover is of a split structure and includes an outer cover and an inner cover. An edge of the inner cover is provided with a snap, which is matched with a snap groove on the housing cover to implement quick disassembly and assembly. The combustion pot abuts against the inner cover through a thermal insulation sealing ring, to implement detachable mounting, thereby facilitating cleaning and refueling. The bottoms of the inner cover and the combustion pot are both provided with smoke outlet holes that are communicated with each other, to ensure that smoke is smoothly output.

Further, a sensor is disposed on the housing cover, and when it is detected that the cover is snapped into the housing in place, a signal is triggered to enable the compressor and the electronic arc generator to be in a workable state, thereby effectively preventing an accidental operation or dry burning. This device is further provided with an automatic shutdown function after 5 minutes of no operation, thereby avoiding power waste and device losses.

Further, the control board is integrated with a display screen and a key, which are disposed at the top of the housing, facilitating operations and real-time check of battery power by a user. A side edge of the housing is provided with a Type-C charging port, which is strong in compatibility and meets modern electrical device habits. An atmosphere lamp panel and a lampshade are further disposed below the combustion pot. The atmosphere lamp panel is connected to a first contact on the housing cover through a second contact, thereby implementing electricity supply and control. A user can switch a plurality of light colors or switch off lights by double clicking the key, thereby enhancing use experience and scenario adaptability.

Compared with the prior art, this disclosure has the following beneficial effects:

Directional air supply is implemented by driving the compressor through the motor and combining the air guide pipe, thereby significantly improving the combustion completeness and smoke stability.

The ceramic thermal insulation sheet, the thermal insulation plate, and the sealing ring are adopted to form a multiple thermal insulation structure, thereby effectively controlling the surface temperature of the housing and eliminating the risk of burns.

The cover is linked with the housing through the snap and the sensor, and the device is started on the premise that the cover is closed in place, thereby greatly improving the use safety.

The modular and detachable design makes cleaning and refueling easy and quick, thereby improving the use convenience and maintenance efficiency.

The Type-C charging port, the power display screen, and the multi-color adjustable atmosphere lamp are equipped, thereby significantly enhancing product practicability and scenario adaptability.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and those of ordinary skill in the art may still derive other accompanying drawings from these accompanying drawings without creative efforts.

Figure 1:
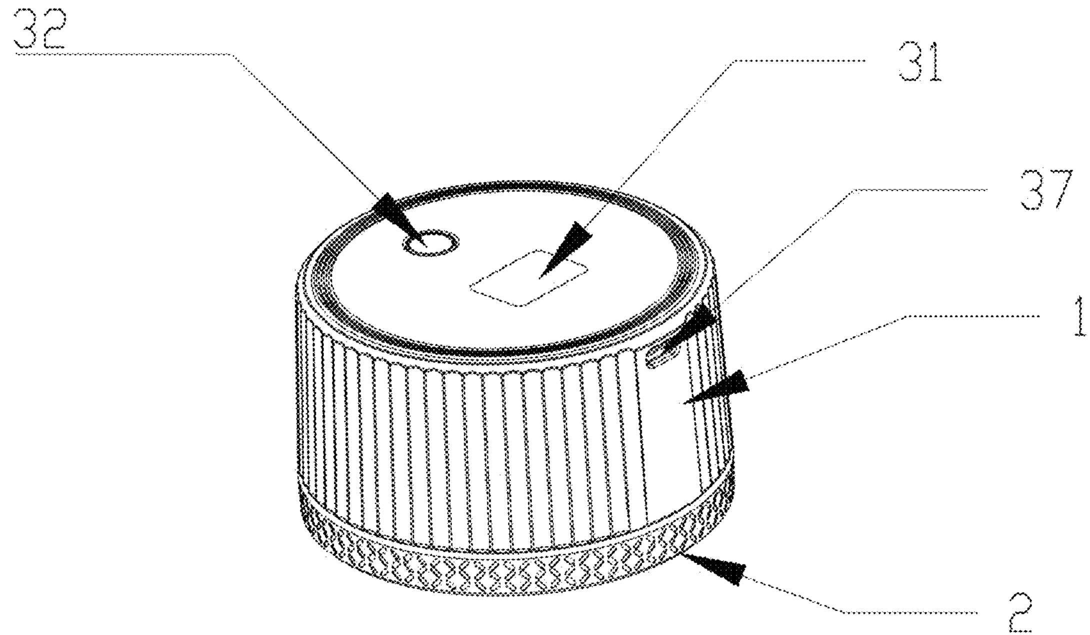
FIG. 1 and FIG. 2 are schematic overall diagrams provided by an embodiment of this disclosure.

Reference numerals in the figures:

1. housing; 11. housing cover; 111. snap groove; 12. thermal insulation plate; 2. cover; 21. outer cover; 22. inner cover; 221. smoke outlet hole; 222. snap; 23. combustion pot; 24. sealing ring; 25. atmosphere lamp panel; 26. lampshade; 27. second contact; 3. control board; 31. display screen; 32. key; 33. sensor; 34. electronic arc generator; 35. ceramic thermal insulation sheet; 36. first contact; 37. charging port; 38. battery; 4. compressor; 5. motor; 6. cup.

Through the above drawings, clear embodiments of this disclosure have been shown, which will be described in more detail in the following text. These drawings and textual descriptions are not intended to limit the scope of the concept of this disclosure in any way, but rather to illustrate the concept of this disclosure for those skilled in the art by referring to specific embodiments.

DETAILED DESCRIPTION OF THE EMBODIMENTS

The following clearly and completely describes the technical solutions in the embodiments of this disclosure with reference to the accompanying drawings in the embodiments of this disclosure. Apparently, the described embodiments are some but not all of the embodiments of this disclosure. Based on the embodiments in this disclosure, all other embodiments obtained by those of ordinary skill in the art without making creative labor fall within the scope of protection of this disclosure.

To make the technical solutions and advantages of this disclosure clearer, the following further describes the embodiments of this disclosure in detail with reference to the accompanying drawings.

Figure 2:
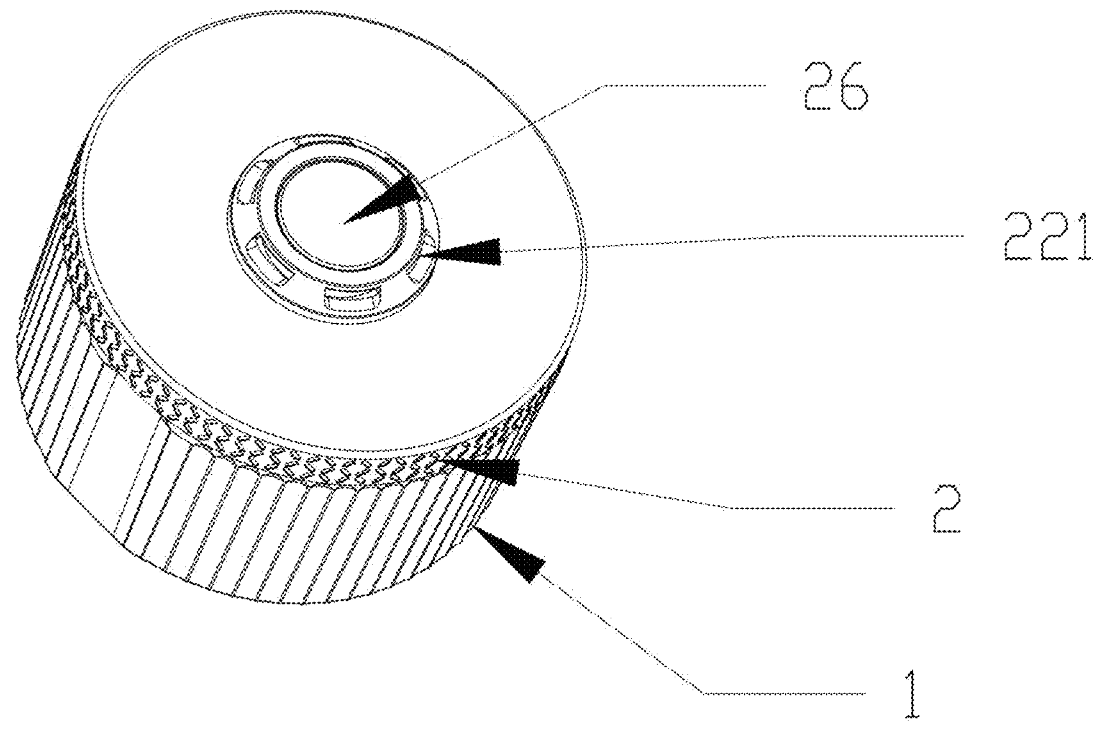
Figure 3:
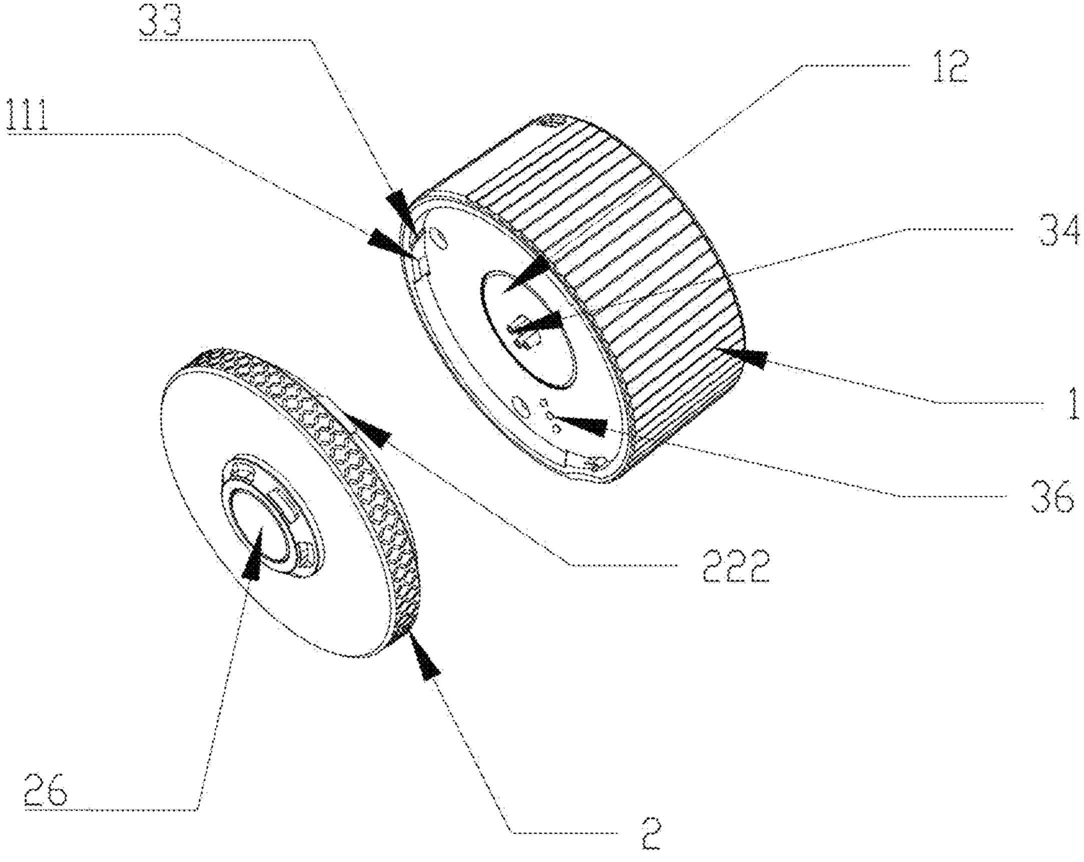
FIG. 3 is a schematic open diagram provided by an embodiment of this disclosure.
Figure 4:
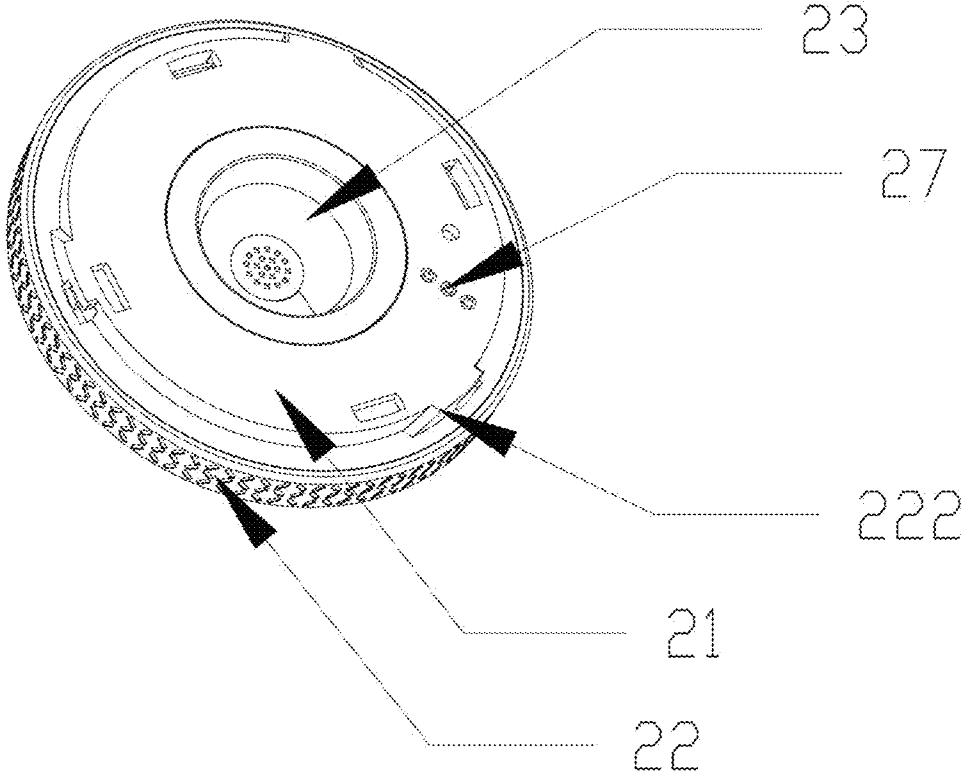
FIG. 4 is a schematic structural diagram of a cover body provided by an embodiment of this disclosure.
Figure 5:
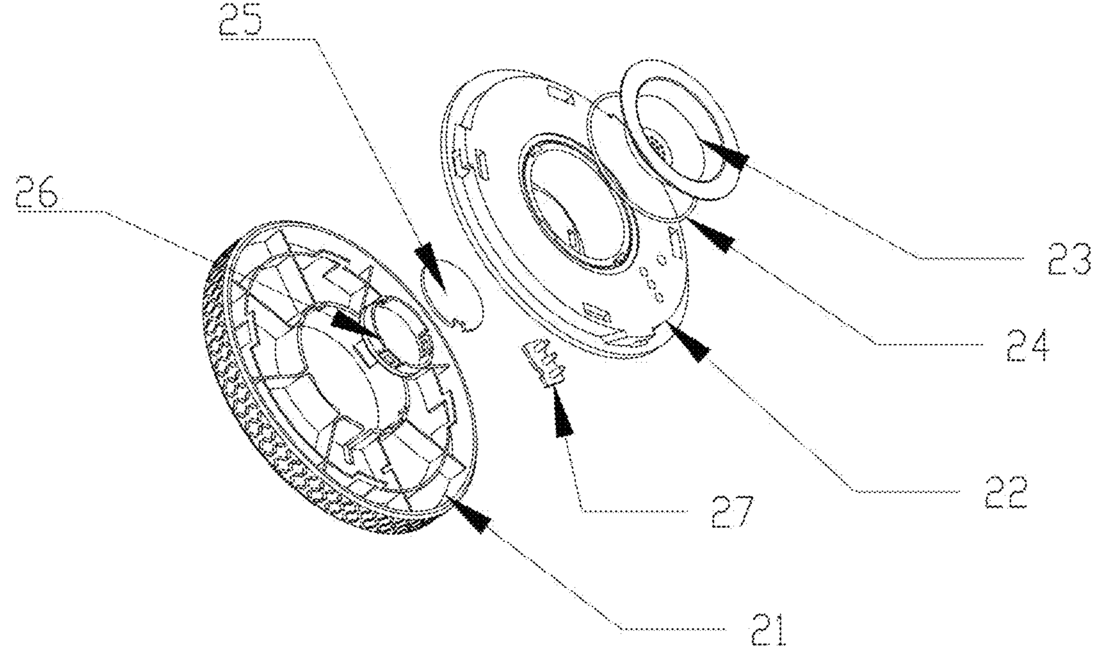
FIG. 5 is a schematic exploded view of a cover body provided by an embodiment of this disclosure.
Figure 6:
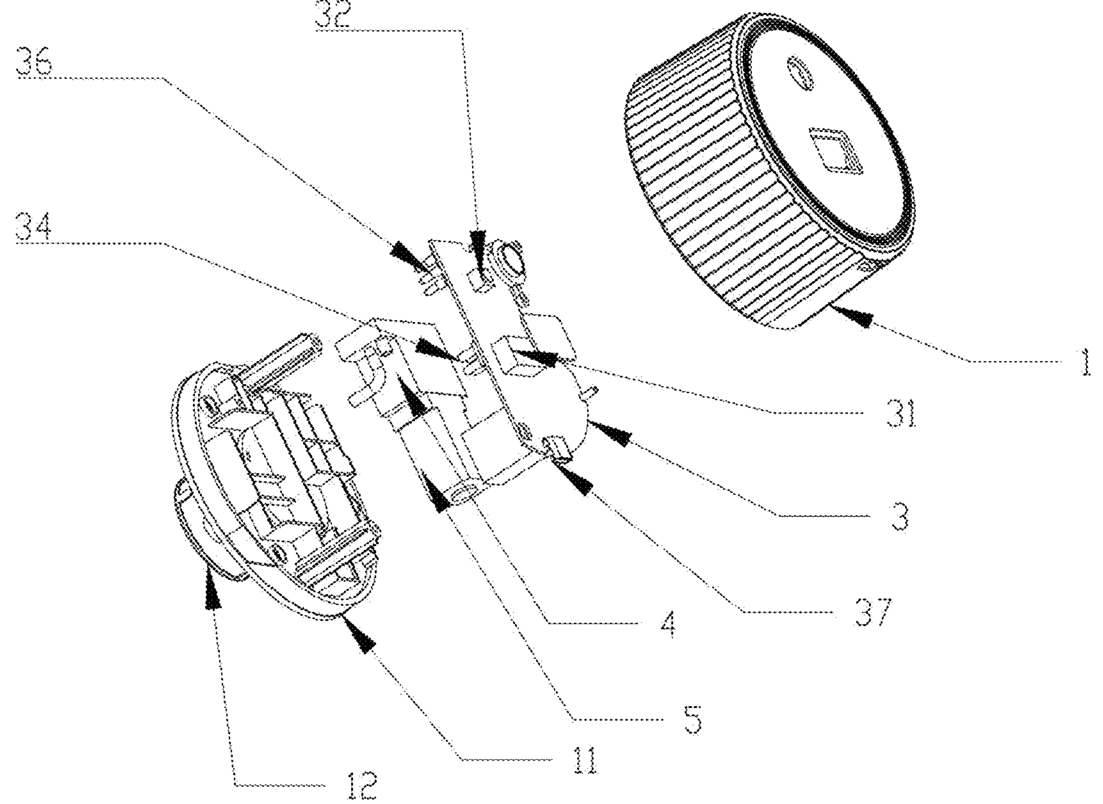
FIG. 6 is a schematic exploded view of a housing provided by an embodiment of this disclosure.
Figure 7:
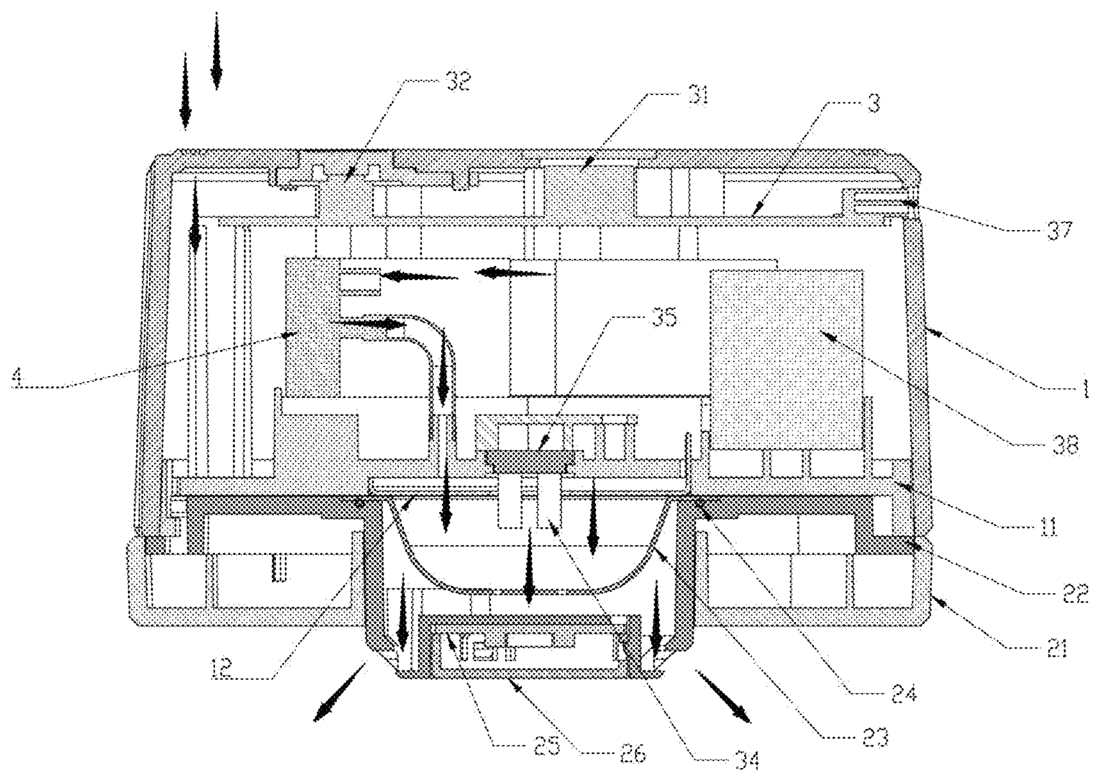
FIG. 7 is an overall cross-sectional view provided by an embodiment of this disclosure.
Figure 8:
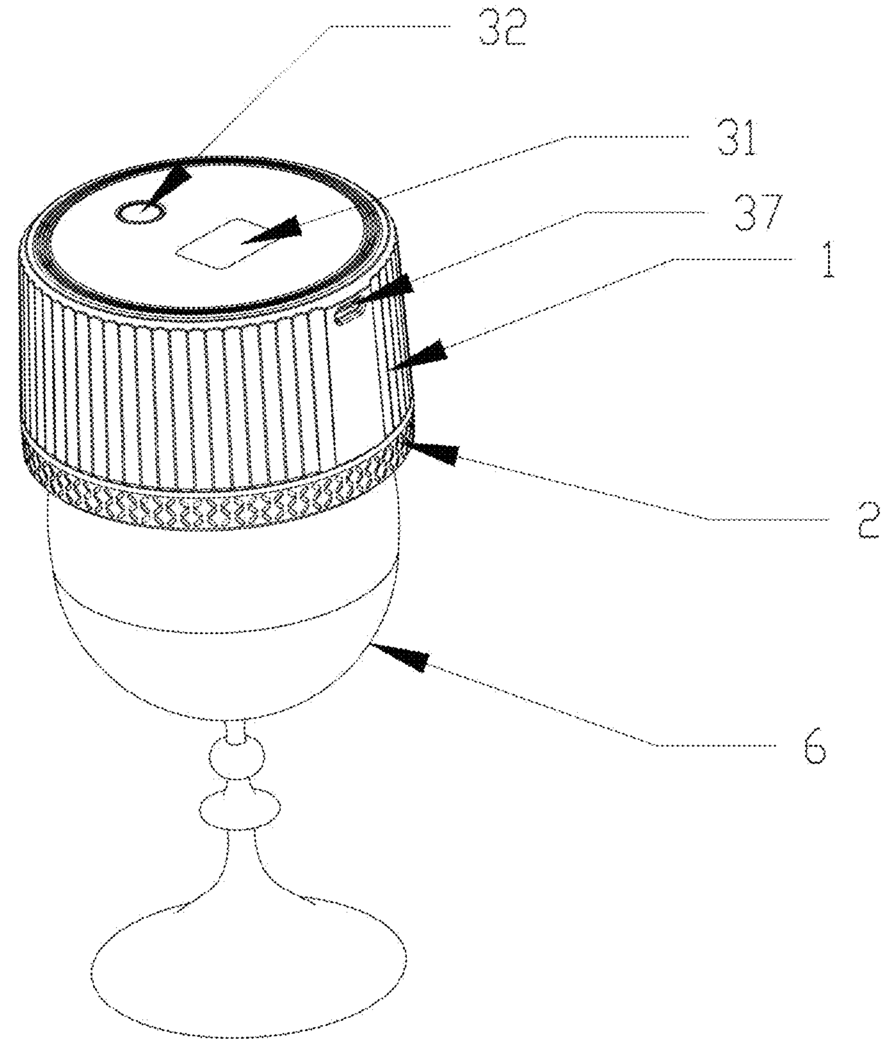
FIG. 8 is a schematic use diagram provided by an embodiment of this disclosure.

Referring to FIG. 1 to FIG. 8, this electronic smoker adopts a modular design, where a control board 3 is fixed in the middle of a housing 1, a display screen 31 and a key 32 are integrated on a surface at the top of the housing 1, and a sensor 33 is located at a snap groove 111 of a housing cover 11. A battery 38 is mounted in the housing 1 and is electrically connected to the control board 3, and a Type-C charging port 37 is formed on a side edge of the housing 1 and is communicated with the control board 3 and the battery 38 through a wire, to meet a charging requirement. A motor 5 and a compressor 4 are fixed on one side in the housing 1, an output shaft of the motor 5 is connected to a driving end of the compressor 4, and an air guide pipe connected to an air outlet of the compressor 4 extends into a reserved opening of a combustion chamber of the housing cover 11, to prepare for subsequent air supply. An electronic arc generator 34 is fixed in the middle of the housing cover 11 through a ceramic thermal insulation sheet 35, the ceramic thermal insulation sheet 35 abuts against the bottom of a combustion pot 23 at the same time, which cannot only transfer ignition heat but also isolate a high temperature of a combustion area from the housing 1, and a thermal insulation plate 12 is sleeved on a periphery of the electronic arc generator 34 and will enclose to form a sealed combustion chamber with the combustion pot 23 mounted subsequently, thereby ensuring safe and efficient combustion.

A cover 2 is of a split structure of "an outer cover 21+an inner cover 22". Internal components of the cover 2 need to be assembled first during assembly and then docked with the housing 1. An atmosphere lamp panel 25 is first placed in a lamp panel groove at the bottom of the inner cover 22. A lampshade 26 is snapped at the bottom of the inner cover 22 through a snap and covers the atmosphere lamp panel 25, to prevent smoke from polluting the lamp panel. At this time, it is necessary to ensure that a second contact 27 of the atmosphere lamp panel 25 is exposed from a reserved hole of the lampshade 26, to facilitate subsequent docking with a first contact 36 of the housing cover 11. The inner cover 22 and the outer cover 21 are snapped and fixed together. Then, a thermal insulation sealing ring 24 is sleeved on an edge at the bottom of the combustion pot 23, and the combustion pot 23 is placed in a groove in the middle of the inner cover 22 subsequently, to ensure that the bottom of the combustion pot 23 is aligned with a smoke outlet hole 221 at the bottom of the inner cover 22, thereby ensuring that the smoke is output smoothly. Finally, the cover 2 is held by hand, a snap 222 at an edge of the inner cover 22 is aligned with the snap groove 111 of the housing cover 11, and slight pressing and rotation are performed until a "click" sound is heard. At this time, the sensor 33 is triggered by the snap 222, the control board 3 receives a signal of "the cover 2 is in place", and the compressor 4 and the electronic arc generator 34 are in a workable state. If the signal is not triggered, the device cannot be started, thereby effectively preventing an accidental operation.

In an ignition and combustion control link, after the device is turned on, the key 32 is pressed, the control board 3 outputs a high voltage signal to the electronic arc generator 34, and the arc generator generates an arc. Heat is transferred to solid fuel such as wood chips in the combustion pot 23 through the ceramic thermal insulation sheet 35 to achieve ignition. At the same time, the control board 3 drives the motor 5 to drive the compressor 4 to work, and the compressor 4 accurately delivers air to the sealed combustion chamber through the air guide pipe, so that the air is evenly acted on the fuel, thereby promoting complete combustion of the fuel, avoiding local carbonization and burnt smell generation, and ensuring stable output of the smoke. An atmosphere lamp function is implemented through the atmosphere lamp panel 25. The atmosphere lamp panel 25 abuts against the first contact 36 of the housing cover 11 through the second contact 27, to be electrically connected to the control board 3. A user can switch on the atmosphere lamp by double clicking the key 32 and switch light colors in a sequence of "redgreen blue switching off" by double clicking the key again. In addition, an interval between double-click operations needs to be less than 1 second, to ensure that the function is triggered normally. Power display and automatic shutdown functions are integrated on the control board 3, and the display screen 31 displays current power of the battery 38 when the device is turned on, which is convenient for the user to learn a power condition. If the device is not operated for 5 minutes, the device will automatically cut off power and shut down, thereby avoiding power waste and device losses.

Standard use processes need to follow the following steps. First, preparation before use is performed. The wood chips remaining in the combustion pot 23 are cleaned, new wood chips are added into the combustion pot 23, and a filling amount does not exceed 66% of a container capacity, thereby preventing overfilling from affecting performance of the device. Then, the assembled cover 2 and housing 1 are docked, the snap 222 of the inner cover 22 is aligned with the snap groove 111 of the housing cover 11, and rotation is performed until the "click" sound is heard, to ensure that the cover 2 is snapped in place to trigger the sensor 33. Subsequently, a smoke output operation is performed. The key 32 is pressed, the device enables a smoke output function, and at the same time, the display screen 31 starts a 10-second countdown and displays remaining time in real time. During this period, the compressor 4 continues to blow air, and the smoke is ejected through the combustion pot 23 and the smoke outlet hole 221 of the inner cover 22. During use, the cover 2 abuts against a cup rim, to enable the smoke outlet hole 221 to be located in the cup rim. After use, the key 32 of a power supply can be pressed and held for 3 seconds to turn off the device. If the device is not shut down manually, the device will be automatically shut down after 5 minutes of no operation.

In an aspect of charging specification, the device adopts the Type-C charging port 37. One end of a charging cable is connected to the Type-C charging port 37 on the side edge of the device, and the other end thereof is connected to the power supply. During charging, the display screen 31 flashes and displays the current power of the battery 38 in real time, which is convenient for the user to learn a charging progress. When the display screen 31 remains stable and displays "100%", it indicates that the device is fully charged and a charging connection can be disconnected.

After considering the specification and practicing this disclosure, those skilled in the art will easily come up with other embodiments of this disclosure. This disclosure is intended to cover any variations, uses, or adaptations of this disclosure that follow the general principles of this disclosure and include common knowledge or customary technical means in the art that are not disclosed in this disclosure. The specification and embodiments are only considered exemplary, and the true scope and spirit of this disclosure are indicated by the above claims.

It should be understood that this disclosure is not limited to the precise structure described above and shown in the accompanying drawings, and various modifications and changes can be made without departing from its scope. The scope of this disclosure is limited only by the appended claims.

What is claimed is:

1. An electronic smoker, comprising a housing (1) and a cover (2) that are detachably connected, a housing cover (11) disposed at a bottom of the housing (1), and a control board (3), a battery (38), a compressor (4), and a motor (5) driving the compressor (4) that are disposed in the housing (1), wherein the cover (2) is provided with a combustion pot (23) used for storing fuel; the housing cover (11) is provided with an electronic arc generator (34) through a thermal insulation sheet, the thermal insulation sheet abuts against the combustion pot (23), the electronic arc generator (34) ignites the fuel in the combustion pot (23), and the compressor (4) blows air into the combustion pot (23) and ejects the air from a smoke outlet hole (221) of the cover (2); and the control board (3) is integrated with a display screen (31) and a key (32), the display screen (31) and the key (32) are disposed on a surface at a top of the housing (1), and a side edge of the housing (1) is provided with a charging port (37);

wherein an atmosphere lamp panel (25) and a lampshade (26) are disposed below the combustion pot (23), the lampshade (26) is detachably connected to a bottom of an inner cover (22) through a snap, and the lampshade (26) is covered on an outer side of the atmosphere lamp panel (25); the atmosphere lamp panel (25) is provided with a second contact (27), and the housing cover (11) is provided with a first contact (36) abutting against the second contact (27); and the atmosphere lamp panel (25) is electrically connected to the control board (3) through the first contact (36) and the second contact (27).

2. The electronic smoker according to claim 1, wherein the cover (2) comprises an outer cover (21) and an inner cover (22), an edge of the inner cover (22) is provided with a snap (222), the housing cover (11) of the housing (1) is provided with a snap groove (111) corresponding to the snap (222), and the cover (2) is detachably connected to the housing (1) through matching between the snap (222) and the snap groove (111); and a thermal insulation sealing ring (24) abuts between the combustion pot (23) and the inner cover (22), the smoke outlet hole (221) is formed at a bottom of the inner cover (22) and a bottom of the combustion pot (23) respectively, and the smoke outlet holes (221) of the inner cover (22) and the combustion pot (23) are communicated with each other.

3. The electronic smoker according to claim 1, wherein the thermal insulation sheet is a ceramic thermal insulation sheet (35); a thermal insulation plate (12) is sleeved on a periphery of the electronic arc generator (34); the thermal insulation plate (12) and the combustion pot (23) enclose to form a sealed combustion chamber; and an air outlet of the compressor (4) extends into the combustion chamber through an air guide pipe, to blow the air into the combustion chamber.

4. The electronic smoker according to claim 1, wherein the charging port (37) is a Type-C interface, and the display screen (31) is used for displaying power of the battery (38) in real time.

5. The electronic smoker according to claim 1, wherein a sensor (33) is disposed on the housing cover (11), and when the cover (2) is snapped into the housing (1) in place, the sensor (33) is triggered to enable the compressor (4) and the electronic arc generator (34) to be in a working state.

6. The electronic smoker according to claim 1, wherein the electronic smoker is provided with an automatic shutdown function and automatically cuts off power after 5 minutes of no operation.

7. The electronic smoker according to claim 1, wherein the atmosphere lamp panel (25) supports switching of a plurality of colors, and by double clicking the key (32), red light, green light, and blue light are switched sequentially or light is switched off.

* * * * *